United States Patent [19]

Bensette

[11] 4,431,121
[45] Feb. 14, 1984

[54] GAME TOWING DEVICE

[76] Inventor: Ernest B. Bensette, 10621 Mt. Vernon Bldg. 5, Apt. 10, Taylor, Mich. 48180

[21] Appl. No.: 484,531

[22] Filed: Apr. 13, 1983

[51] Int. Cl.³ .............................................. B65D 51/04
[52] U.S. Cl. ................................... 224/153; 224/210; 224/211; 224/261; 224/921; 280/1.5
[58] Field of Search ............... 224/261, 151, 155, 156, 224/158, 103, 160, 161, 210, 211, 921, 154, 153; 43/1; 280/1.5

[56] References Cited

U.S. PATENT DOCUMENTS

| | | | |
|---|---|---|---|
| 2,996,228 | 8/1961 | Bauman | 280/1.5 X |
| 3,690,525 | 9/1972 | Koons | 224/156 X |
| 3,734,367 | 5/1973 | Jackson | 224/211 X |
| 4,045,040 | 8/1977 | Fails | 224/921 X |

Primary Examiner—Steven M. Pollard
Attorney, Agent, or Firm—Charles W. Chandler

[57] ABSTRACT

A frame is disclosed for towing a deer out of the woods. The frame has a pair of supports mounted on the back of the hunter, and a pivotal carriage on which the forward end of the deer is strapped. The height of the carriage above the ground can be adjusted.

3 Claims, 4 Drawing Figures

GAME TOWING DEVICE

BACKGROUND OF THE INVENTION

This invention is related to means for towing large game such as deer from the location in the woods where it is shot to where it is to be dressed.

Relatively large game, such as deer typically weigh up to 230 lbs. or more. When they have been shot by the hunter, it is usually in a relatively inaccessible location where a wheeled device cannot be used. Frequently the deer must be moved quite a distance to where it is to be dressed. The hunter must tow the deer up and down hills and over rough terrain usually by attaching a rope or strap around the deer and then pulling. Some towing harnesses have been disclosed in prior art, for example in U.S. Pat. No. 2,996,228 which issued to M. W. Bauman in 1961, and U.S. Pat. No. 3,038,644 which issued to A. O. Johnson in 1962.

The problem with many prior art harnesses is that they neither properly position the deer for easy towing, nor readily accommodate the height of the hunter.

SUMMARY OF THE INVENTION

The broad purpose of the present invention is to provide a towing device comprising a frame which is strapped on the back of the hunter, having a pair of spaced vertical supports, each having a series of longitudinally-spaced openings. The carriage on which the forward portion of the deer is strapped, is pivotally connected to the two supports at a height adjusted to accommodate the hunter's height. A pair of stops on the supports limit the downward swing of the carriage so that it will not strike the hunter's legs as he is walking under a load.

A strap is wrapped around the deer beneath his front legs to connect him to the carriage. A second strap is connected around the deer's neck to keep his head in an elevated position. The carriage swings down to a position about 18 inches from the ground. In this position, the front portion of the deer is supported above the ground so that he can be easily towed without the hunter having to carry more than the front quarter of the deer.

Still further objects and advantages of the invention will become readily apparent to those skilled in the art to which the invention pertains upon reference to the following detailed description.

DESCRIPTION OF THE DRAWING

The description refers to the accompanying drawing in which like reference characters refer to like parts throughout the several views, and in which.

DESCRIPTION OF THE PREFERRED EMBODIMENT

Figure 1:
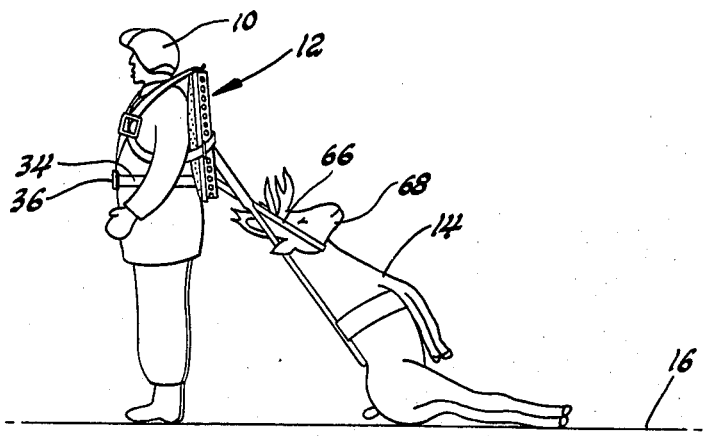
FIG. 1 is a view illustrating a hunter employing the preferred device to tow a deer.

Referring to the drawing, FIG. 1 illustrates a hunter employing a towing device generally indicated at 12, for towing deer 14 across ground 16. The towing device has a padded frame 18.

Figure 4:
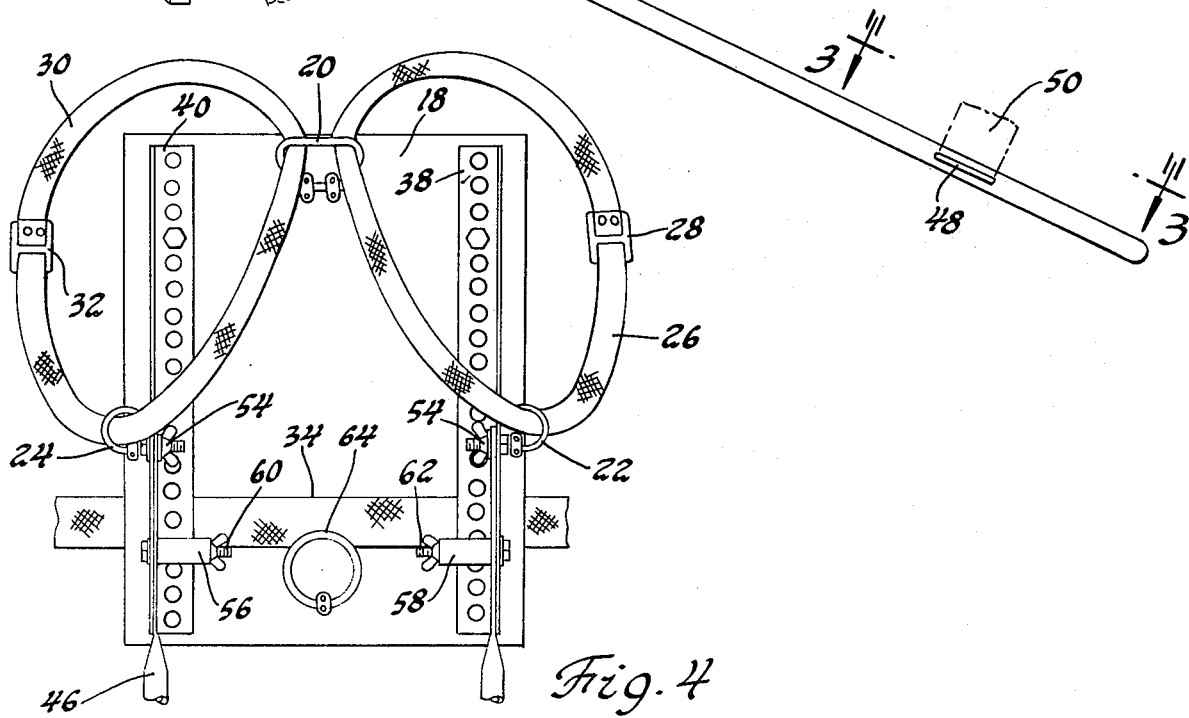
FIG. 4 is a view of the device as viewed from the rear of the hunter.

Referring to FIG. 4, frame 18 carries a ring 20 at its upper end, and a pair of lower side rings 22 and 24. A right strap 26 is looped through rings 20 and 22 and buckle means 28 provide means for connecting the ends of the strap to the front of the user. Similarly, a second strap 30 is looped through rings 20 and 24 and carries buckle means 32 for connecting the left strap to the front of the user. The two straps are worn over the hunter's shoulders, as illustrated.

As best illustrated in FIGS. 1 and 4 a belt 34 is connected to the lower end of frame 18. Buckle means 36 connect the ends of the belt together around the user's waist so that the frame is comfortably but securely mounted on the user's back.

A pair of metal angles form vertical supports 38 and 40 on frame 18. The two supports, when the frame is mounted on the hunter's back, are disposed in a generally vertical position generally parallel to one another and spaced about 12 inches apart. As best illustrated in FIG. 2, each support has a series of longitudinally spaced openings 42.

Figure 2:
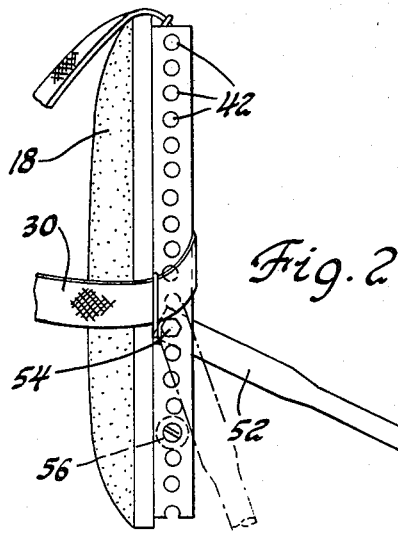
FIG. 2 is an enlarged fragmentary view of the device showing the adjustable supports.
Figure 3:
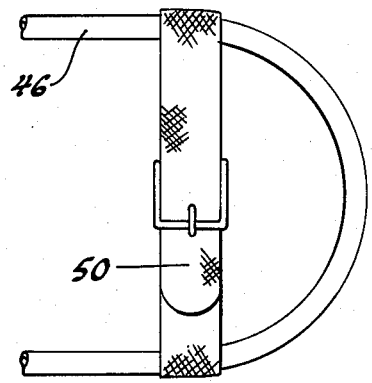
FIG. 3 is a view as seen along lines 3—3 of FIG. 2.

Referring to FIGS. 2 and 3, a carriage 44 is connected to the frame. Carriage 44 comprises a tubular, generally U-shaped member 46. The U-shaped member has slot means 48 receiving a strap 50 adapted to be wrapped around the deer beneath his forelegs. The upper ends of the carriage legs are flattened, as illustrated at 52, and each has an opening for receiving fastener means 54 which pivotally connect the carriage to the frame. Fastener means 54 may comprise a threaded fastener or the like which permits the carriage to freely pivot as the user moves across uneven ground.

A pair of dowels 56 and 58 are connected by fastener means 60 and 62 as best illustrated in FIG. 4. The dowels are each located beneath the carriage legs in an adjusted position so that as the carriage legs swing downwardly, their lower-most position is limited as they engage the dowels. Thus the dowels form stop means preventing the carriage from swinging down and into the hunter's legs as he moves across the ground.

The carriage is fastened to supports 38 and 40 in a position such that the lower rearward end of the carriage is about 18 inches off the ground. The carriage is preferrably about 33 inches long and supports 38 and 40 are about 14 inches in height with the adjustment openings being about 1 inch between centers. Thus the user can readily adjust that portion of the carriage that attaches to the frame at a position that accommodates his height as well as providing an optimum angle for towing the weight of the deer as the user moves across the ground. The connection between the carriage and the frame is adapted to accommodate not only the hunter's height and build but the weight and size of the game being towed.

A fourth ring 64 is connected to the lower part of frame and a strap 66 is wrapped around the deer's neck and then connected to the ring to maintain the deer's head in an elevated position.

In use, the hunter straps the deer to the carriage using strap 50, and then straps the deer's head 68 to ring 60. The hunter then squats down to attach belts 26, 30 and 34 around his body. He then straightens his legs to raise the front quarter of the deer off the ground and proceeds to tow the deer toward the location where it is to be dressed.

Having described my invention, I claim:

1. A game towing device comprising:
   a frame;
   shoulder strap means connected to the frame engageable about the user's body to support the frame on the users back;
   an elongaged carriage comprising a U-shaped member having an upper end and a lower end, and means for strapping a deer or other similar game on the lower end thereof;
   means on the frame forming a pair of horizontally spaced supports adapted to be disposed in a generally vertical position;
   means for pivotally connecting the upper end of the carriage to the frame supports at selected vertical positions thereon; and
   stop means adjustably mounted on the supports for engaging the carriage to limit the lowermost pivotal position of the lower carriage end whereby the lower end of the carriage is spaced from the ground but pivotally movable with the deer as the user tows the deer strapped to the carriage.

2. A device as defined in claim 1, including second strap means for fastening the game to the carriage, and an eye carried on the frame and means for attaching the head of the game to the eye.

3. A device as defined in claim 1, in which the pair of spaced supports each have a series of regularly spaced openings formed therealong, the fastener means are received in selected openings for connecting the carriage means to the frame, and the stop means are received in selected openings beneath the fastener means such that the carriage means is disposed in abutment with the stop means in the lowermost position of the carriage means.

* * * * *